United States Patent
Suttil et al.

(10) Patent No.: US 11,276,855 B2
(45) Date of Patent: Mar. 15, 2022

(54) ENERGY DENSE MATERIALS FOR REDOX FLOW BATTERY

(71) Applicant: PHILLIPS 66 COMPANY, Houston, TX (US)

(72) Inventors: James Anthony Suttil, Bartlesville, OK (US); Sharmila K. Samaroo, Benicia, CA (US); Neal D. McDaniel, Ochelata, OK (US); Jeffrey H. Drese, Owasso, OK (US); Alexander Zachariah Wilbee, Bartlesville, OK (US); Hongjin Tan, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 49 days.

(21) Appl. No.: 16/904,758

(22) Filed: Jun. 18, 2020

(65) Prior Publication Data

US 2020/0403232 A1 Dec. 24, 2020

Related U.S. Application Data

(60) Provisional application No. 62/862,874, filed on Jun. 18, 2019.

(51) Int. Cl.
| | |
|---|---|
| *H01M 8/18* | (2006.01) |
| *H01M 8/04186* | (2016.01) |
| *H01M 4/36* | (2006.01) |
| *H01M 4/60* | (2006.01) |
| *H01M 8/04082* | (2016.01) |
| *H01M 4/58* | (2010.01) |

(52) U.S. Cl.
CPC .......... *H01M 4/368* (2013.01); *H01M 4/582* (2013.01); *H01M 4/60* (2013.01); *H01M 8/04186* (2013.01); *H01M 8/04201* (2013.01); *H01M 8/188* (2013.01)

(58) Field of Classification Search
CPC ........ H01M 4/368; H01M 8/188; H01M 4/60; H01M 8/04201; H01M 4/582; H01M 8/04186
See application file for complete search history.

(56) References Cited

U.S. PATENT DOCUMENTS

| | | | |
|---|---|---|---|
| 2015/0017567 A1* | 1/2015 | Noack | H01M 8/225 429/498 |
| 2015/0255823 A1* | 9/2015 | Anderson | H01M 8/20 429/418 |

OTHER PUBLICATIONS

Harry D. Pratt, Alyssa J. Rose, Chad L. Staiger, David Ingersoll and Travis M. Anderson, "Synthesis and Characterization of ionic liquids containing copper, manganese, or zinc coordination cations", Dalton Transactions, 2011, vol. 40, p. 11396.
(Continued)

*Primary Examiner* — Stewart A Fraser
(74) *Attorney, Agent, or Firm* — Phillips 66 Company

(57) ABSTRACT

Redox flow battery performance may be improved with a metal containing ionic liquid as a liquid electrolyte. Metal containing ionic liquids are liquids at all temperatures of interest and therefore do not need dilution. As such, voltage separation between the anolyte and catholyte may exceed 0.5 V and therefor rival current state-of-the-art energy storage technologies and with higher voltage separation may attain energy densities above 100 Wh/L.

13 Claims, 7 Drawing Sheets

(56) References Cited

OTHER PUBLICATIONS

Harry D. Pratt III, Jonathan C. Leonard, Leigh Anna M. Steele, Chad L. Staiger, Travis M. Anderson, "Copper Ionic Liquids: Examining the Roll of the Anion in Determining Physical and Electrochemical Properties", Inorganica Chimica Acta, vol. 396, 2013, pp. 78-83.

Harry D. Pratt, David Ingersoll, Nicholas S. Hudak, Bonnie B. McKenzie, Travis M. Anderson, "Copper Ionic Liquids: Tunable Ligand and Anion Chemistries to Control Electrochemistry and Deposition Morphology", Journal of Electroanalytical Chemistry, 2013, vol. 704, pp. 153-158.

Leo J. Small, Harry D. Pratt III, Chad L. Staiger and Travis M. Anderson, MetILs3: A Strategy for High Density Energy Storage Using Redox-Active Ionic Liquids, Advanced Sustainable Systems, vol. 1, 2017, pp. 1-7.

Akihiro Shimizu, Keisuke Takenaka, Naoyuki Hanada, Toshiki Nokami, Toshiyuki Itoh, and Jun-Ichi Yoshida, "Liquid Quinones for Solvent-Free Redox Flow Batteries", Advanced Materials, vol. 29, 2017, pp. 1-5.

Xiaoliang Wei, Wu Xu, Murugesan Vijayakumar, Lelia Cosimbescu, Tianbiao Liu, Vincent Sprenkle and Wei Wang, 'TEMPO-Based Catholyte for High-Energy Density Nonaqueous Redox Flow Batteries, Advanced Materials, vol. 26, 2014, pp. 7649-7653.

Jinhua Huang, Lei Cheng, Rajeev S. Assar, Peiqi Wang, Zheng Xue, Anthony K. Burrell, Larry A. Curtiss, and Lu Zhang, Liquid Catholyte Molecules for Nonaqueous Redox Flow Batteries, Advanced Energy Materials, vol. 5, 2015, pp. 1-6.

Guangtao Cong, Yucun Zhou, Zhejun Li and Yi-Chun Lu, "A Highly Concentrated Catholyte Enabled by a Low-Melting-Point Ferrocene Derivative", ACS Energy Letters, vol. 2, 2017, pp. 869-875.

* cited by examiner

ENERGY DENSE MATERIALS FOR REDOX FLOW BATTERY

CROSS-REFERENCE TO RELATED APPLICATIONS

This application is a non-provisional application which claims benefit under 35 USC § 119(e) to U.S. Provisional Application Ser. No. 62/862,874 filed Jun. 18, 2019 entitled "ENERGY DENSE MATERIALS FOR REDOX FLOW BATTERY," which is hereby incorporated by reference in its entirety.

STATEMENT REGARDING FEDERALLY SPONSORED RESEARCH OR DEVELOPMENT

None.

FIELD OF THE INVENTION

This invention relates to flow battery systems and more particularly to the liquids used in flow batteries.

BACKGROUND OF THE INVENTION

A redox flow battery is an electrical energy storage device that uses liquid electrolytes rather than solid electrodes to store and deliver electric power. One liquid electrolyte is called a catholyte and it is analogous to the materials that make up the cathode in a conventional, solid-state battery. The other liquid electrolyte is called the anolyte and is analogous to the materials that make up the anode of a conventional, solid-state battery. An ion transfer membrane typically separates the anolyte from the catholyte, only allowing specific ions to cross from one liquid electrolyte to the other to maintain charge neutrality during charging and discharging of the anolyte and catholyte.

The liquid electrolytes are formulated to have molecular species with multiple states of oxidation which are stable over long time periods within a foreseeable temperature range. The cycling of these species through their accessible oxidation states during battery charge and discharge is referred to as a reduction/oxidation process, or a redox process for short.

The chemistry of potential catholyte and anolyte liquids are selected as a pair that respectively provide the electromotive force of the battery and the electric power available in a fixed volume for a redox flow battery. Contemporary redox flow battery chemistries exhibit a maximum energy density that is on par with other technologies used for stationary energy storage, such as lithium-ion batteries (when accounting for the packing density of batteries in real installations, which is limited by heat management and safety concerns). More specifically, a volumetric energy density range of 20-25 Wh/L is typical, when considering the overall combined volumes of the independent catholyte and anolyte storage tanks.

The energy density of a redox flow battery directly dictates the overall footprint of the battery, and for many applications it is desired to have as small a footprint as possible. There are continual efforts to improve energy density in redox flow batteries and reduce their effective costs to make them more competitive in our electric energy consuming world. These efforts include the exploration of high voltage, non-aqueous chemistry, as well as that of multi-electron redox transfer chemistries.

BRIEF SUMMARY OF THE DISCLOSURE

The present invention relates to a redox flow battery that includes a catholyte, an anolyte, a catholyte storage tank for storing the catholyte, an anolyte storage tank for storing the anolyte, and a power cell arranged for the catholyte and anolyte to coexist and be physically separated while also in ion communication with one another. The redox flow battery also includes a catholyte pump to circulate the catholyte from the catholyte storage tank to the power cell and back to the catholyte storage tank and an anolyte pump to circulate anolyte from the anolyte storage tank to the power cell and back to the anolyte storage tank. The redox flow battery particularly includes that one of the catholyte and anolyte comprises a metal containing ionic liquid.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
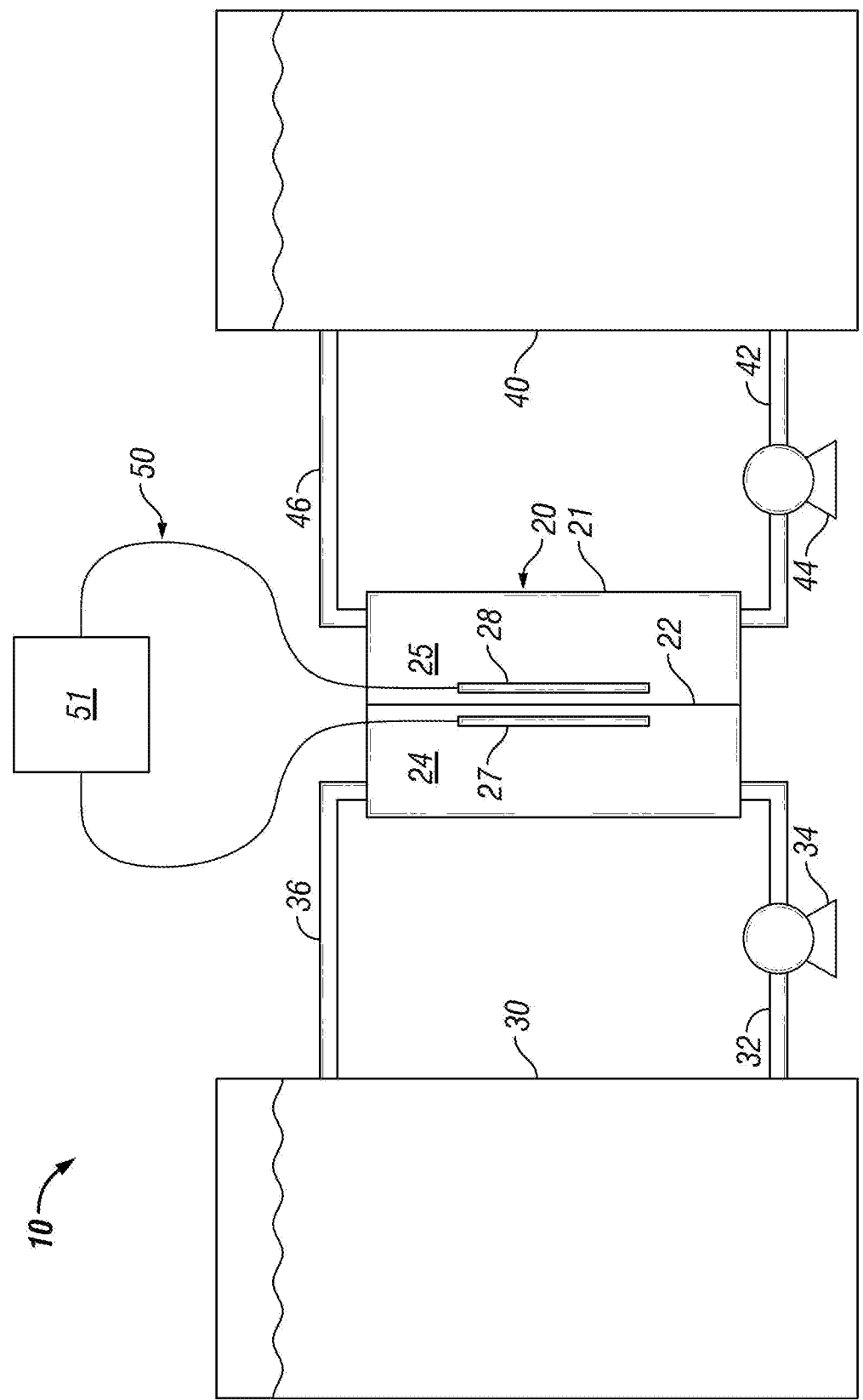
FIG. 1 is a diagram showing a basic flow battery configuration.

Turning to FIG. 1, a conventional redox flow battery is indicated by the arrow 10 with a power cell 20 at the center. The power cell 20 includes a housing 21 with an ion-selective membrane 22 dividing the housing into two compartments 24 and 25. The liquid anolyte is on the left side of the housing 21 in anolyte compartment 24 and the liquid catholyte is on the right side of the housing 21 in catholyte compartment 25. Preferably, each of the compartments 24 and 25 are substantially filled with the respective liquid electrolyte. The anolyte compartment 24 contains liquid anolyte that is continually refreshed from anolyte tank 30 via an anolyte supply conduit 32 and an anolyte circulation pump 34. Anolyte is returned from the housing 21 to the anolyte tank 30 via anolyte return line 36. Similarly, the catholyte side of the housing is supplied with liquid catholyte from catholyte tank 40 via catholyte supply conduit 42 and catholyte circulation pump 44 and the catholyte is returned to tank 40 via catholyte return line 46. Power cell 20 further includes anolyte electrode 27 and catholyte electrode 28 that are each spaced from the ion membrane, but in contact with their respective electrolyte liquids. The electrodes 27 and 28 serve as electrical contacts for the flow battery 10 to be in electrical connection with a circuit 50 that includes an electric load 51.

The present invention relates to a class of materials that can be used as either anolytes or catholytes within redox flow batteries depending on the selection of the other electrolyte. It should be understood that all elements and molecular structures have varying electron affinity and that it is preferred to select catholytes with substantially higher electron affinity than the anolyte. The presently disclosed class of materials has a moderate electron affinity making it useful as either a catholyte or anolyte depending on the electron affinity of the other electrolyte.

The advantage of these materials is that they are engineered to simultaneously fulfill the roles of solvent, redox-active material, and supporting (charge-balancing) electrolyte. In particular, these materials are designed to be redox-active ionic species that are liquids (or will readily liquify with small amounts of additives or cosolvents) over an expected temperature range in which the battery will operate. The redox-active ionic liquids disclosed herein can be described as having the following properties: 1) they exist in the liquid state close to room temperature or ambient temperature or will readily liquify with small amounts of additives or cosolvents at these temperatures; 2) they are able to undergo at least one reversible reduction/oxidation event; and, 3) they consists of the general formula [Imidazolium]$_{(4-x)}$ [Metal$^{(x+)}$(halide)$_4$] where the imidazolium is selected from any di-alkyl functionalized forms, where the metal is selected from the transition metals, preferably the first row of transition metals, and where the halide is any of the halogens, preferably bromine or chlorine, where chlorine is more preferred.

Figure 2:
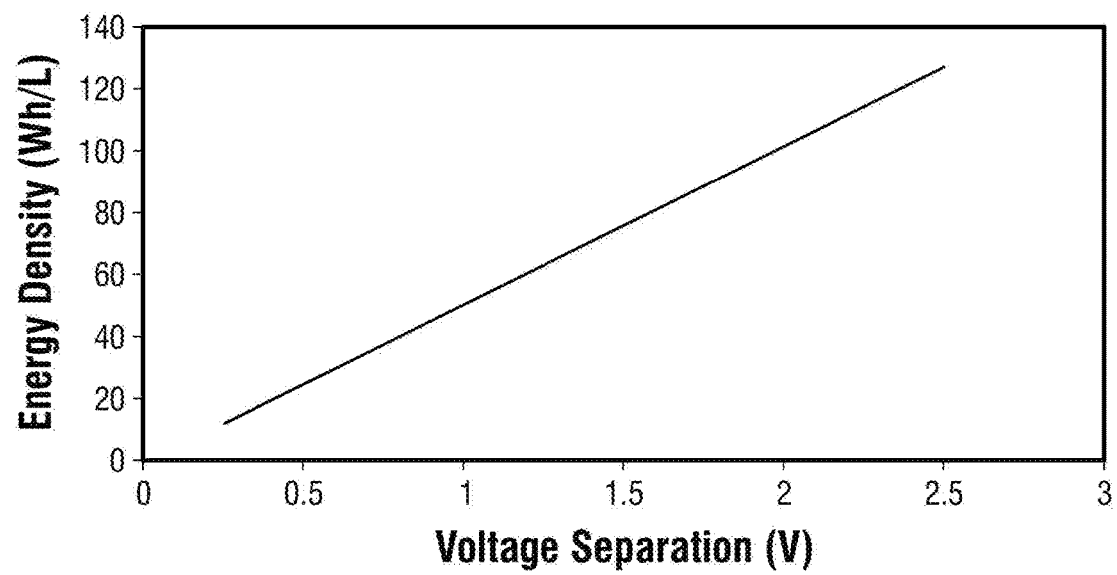
FIG. 2 is a diagram showing the fundamental relationship between anolyte/catholyte redox potential separation (cell voltage) and the resulting energy density.

In the most preferred embodiment, 1-Butyl-3-methylimidazolium (BMIM) iron chloride constitutes the redox-active ionic liquid. More specifically, this embodiment comprises a ferrous tetrachloride (FeCl$_4^{2-}$) or tetrachloroferrate (FeCl$_4^-$) anion, balanced by a BMIM cation. As mentioned above, the advantage that this electrolyte presents is that it may be used in a redox flow battery application without solvent or supporting electrolyte, and that its charge density is therefore relatively large. For example, [BMIM][FeCl$_4$] has a maximum charge density of 109 Ah/L while [BMIM]$_2$[FeCl$_4$] has a maximum charge density of 68 Ah/L, both at 100% concentration. This is relatively dense, compared to an average of about 25-30 Ah/L for vanadium (II/III) ions in an all-vanadium redox flow battery. The ionic species serve all three purposes (solvent, redox-active material, and supporting electrolyte) in a singular molecular species where each purpose must typically be met by a combination of materials for other electrolytes for redox flow batteries. One may decide to add additional fluids to the ionic electrolyte for thermal or chemical stability, corrosion control, viscosity adjustment and other foreseeable reasons, so it is expected that the ionic electrolyte may not be neat or 100% concentration. It is expected that the ionic electrolyte would be at least one third of the liquid in its half-cell or 33% concentration, but concentration above 50% would be more expected and may be preferred above 70% and most preferred at between 80% and about 95%. The higher the concentration of the ionic liquid in the electrolyte, the higher the energy density that is expected Turning now to FIG. 2, the advantage of the invention electrolyte with such dense redox-active species can be seen by graph where a second electrolyte partner, with the equivalent charge density, forming a redox couple with a voltage separation in the range of 0.25 to 2.5 volts shows substantial energy density. Typical energy density numbers for a redox couple provides less than 20-25 Wh/L based on the current vanadium redox flow battery technology.

Figure 3:
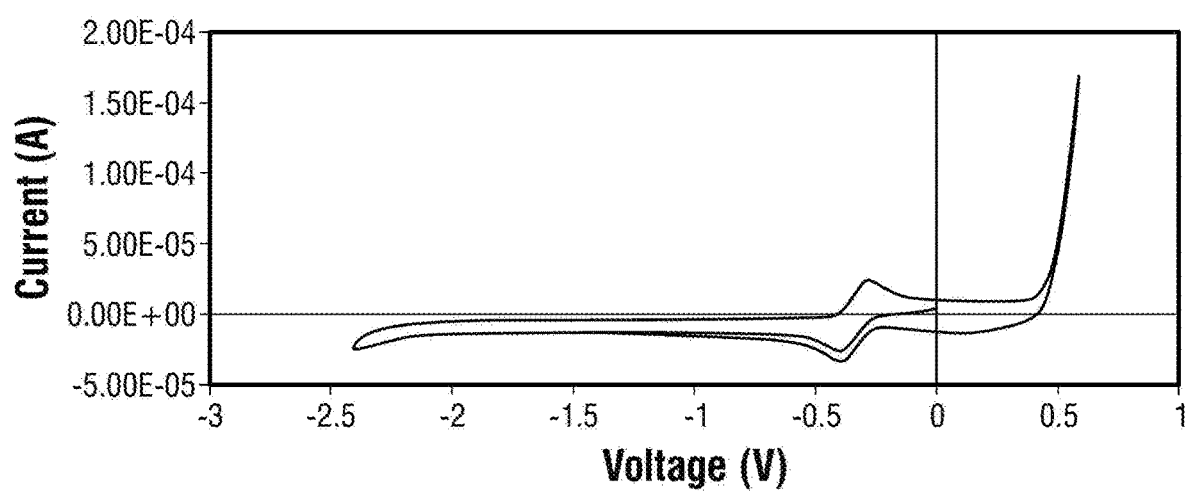
FIG. 3 is a cyclic voltammogram showing the reversible redox behavior of 0.05 M [BMIM][FeCl$_4$] at a scan rate of 100 mV/s under standard conditions, at a graphite working electrode, and referenced to the 0.01 M Ag/AgNO$_3$, acetonitrile-based reference electrode.
Figure 4:
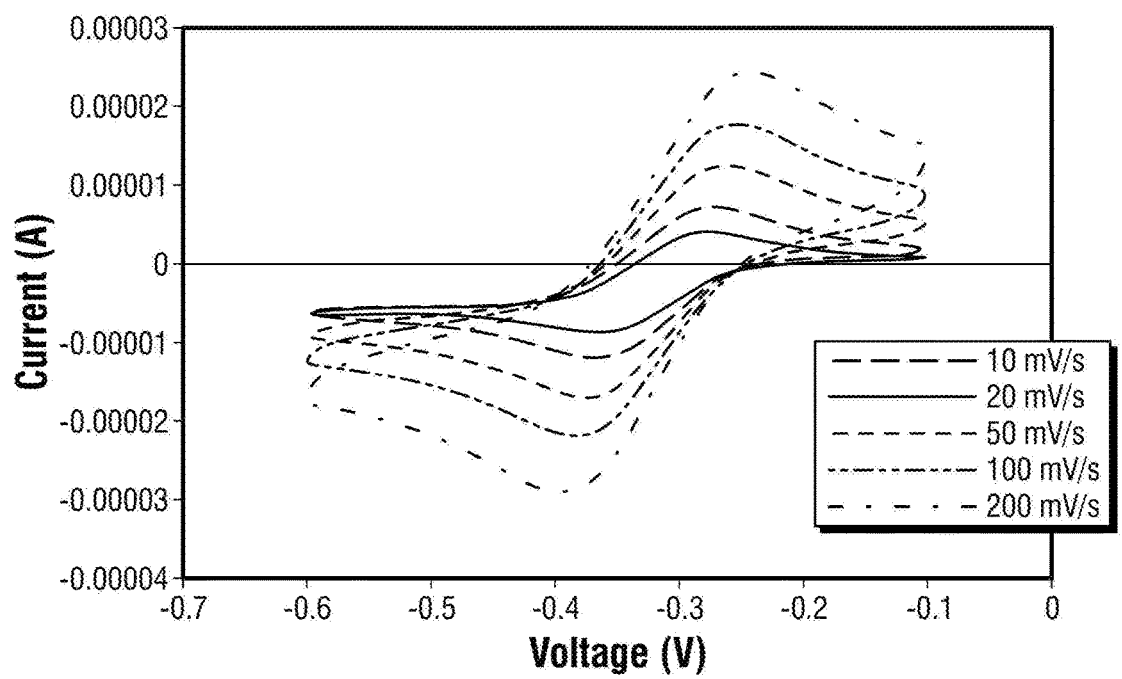
FIG. 4 is a superimposition of several cyclic voltammograms centered on the 0.05 M [BMIM][FeCl$_4$] redox event, taken at different scan rates ranging from 10 mV/s to 200 mV/s.

To verify that Bmim iron chloride (BIC) is sufficiently stable in redox chemistry, cyclic voltammetry has been performed and it shows a reversible redox couple centered at −0.35 V versus a 0.01 M silver/silver-ion (Ag/Ag$^+$) reference electrode. In FIG. 3, cyclic voltammetry scanning of 1 mM of BIC dissolved in 0.1 M of tetrabutylammonium hexafluorophosphate/acetonitrile under a nitrogen atmosphere. Using a glassy carbon electrode with a silver/silver-ion reference electrode and platinum wire counter electrode at a scan rate of 100 mV/s, it is shown that BIC gives a single, reversible redox event in the potential range of −2.5 V to 0.5 V. Notably, no degradation products are detected across this range, excluding the degradation of the solvent/supporting electrolyte mixture at ~0.5 V. This wide range of electrochemical stability is advantageous to redox flow battery applications. In a further narrowed scan window of −0.6 V to −0.1 V, it is seen in FIG. 4 that at various scan rates of 10 mV/s, 20 mV/s, 50 mV/s, 100 mV/s and 200 mV/s that the current responded in a reversible manner on both the forward and reverse scan directions. The current peak height ratios shown in Table 1 show the high degree of reversibility of the redox event as demonstrated by the values ranging from 0.98 to 1.04 which are close to the ideal value of 1 at unity. Overall, FIG. 4 and Table 1 provides current peak height ratios of BIC at varying scan rates and in particular shows that BIC has a highly reversible and stable redox event centered at 0.35 V which is desirable for a redox flow battery application.

TABLE 1

| Scan rate (mV/s) | Current Peak Height Ratio |
| --- | --- |
| 10 | 1.02 |
| 20 | 0.98 |
| 50 | 0.99 |
| 100 | 0.99 |
| 200 | 1.04 |

Figure 5:
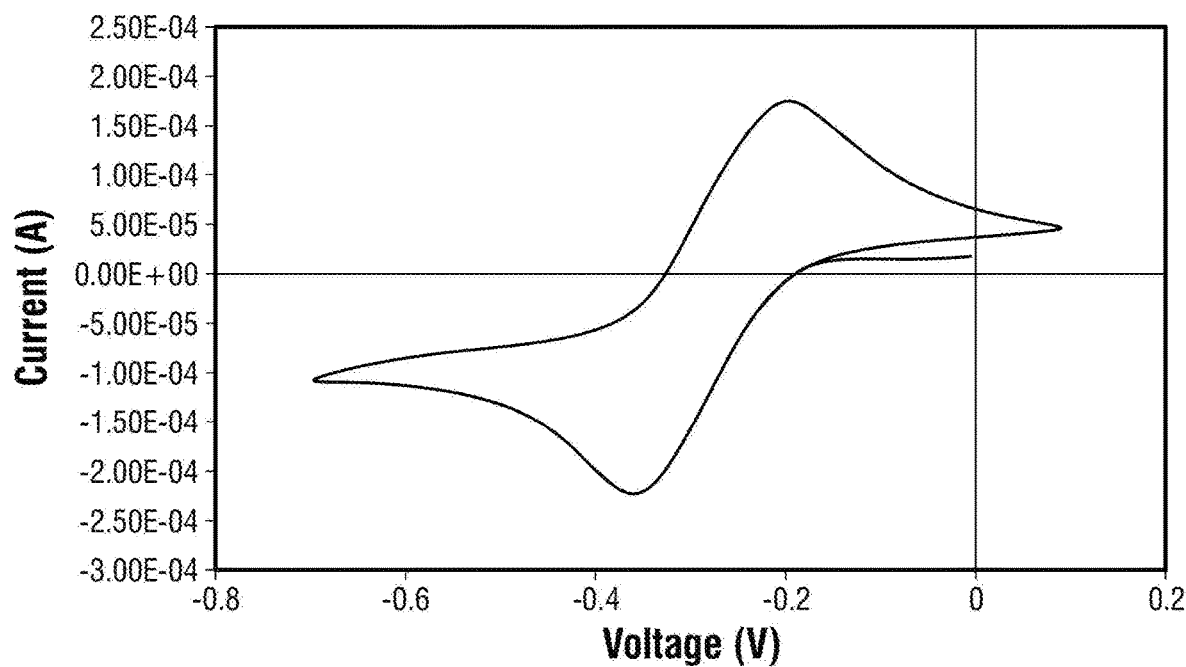
FIG. 5 is a superimposition of one thousand cyclic voltammograms centered on the 0.05 M [BMIM][FeCl$_4$] redox event, as indication of stability over time.
Figure 6:
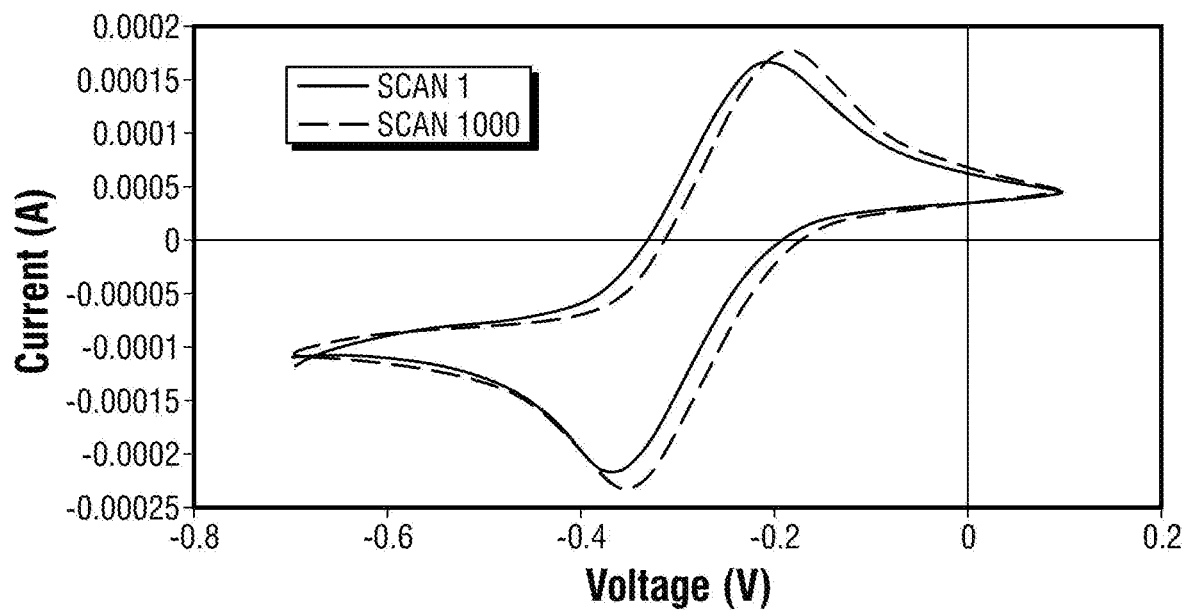
FIG. 6 is a superimposition of the first and one thousandth scans from FIG. 5.

In FIG. 5, 1000 cyclic voltammetry scans are shown under the same conditions as shown in FIG. 3 within a range of −0.7 V up to 0.1 V. Similarly, FIG. 6 shows a comparison of the first cycle scan with the $1000^{th}$ cycle scan. This indicates a high degree of stability of BIC during the redox cycling of the material, which is a key characteristic of redox flow batteries which are expected to experience many thousands of cycles during their lifetime.

Figure 7:
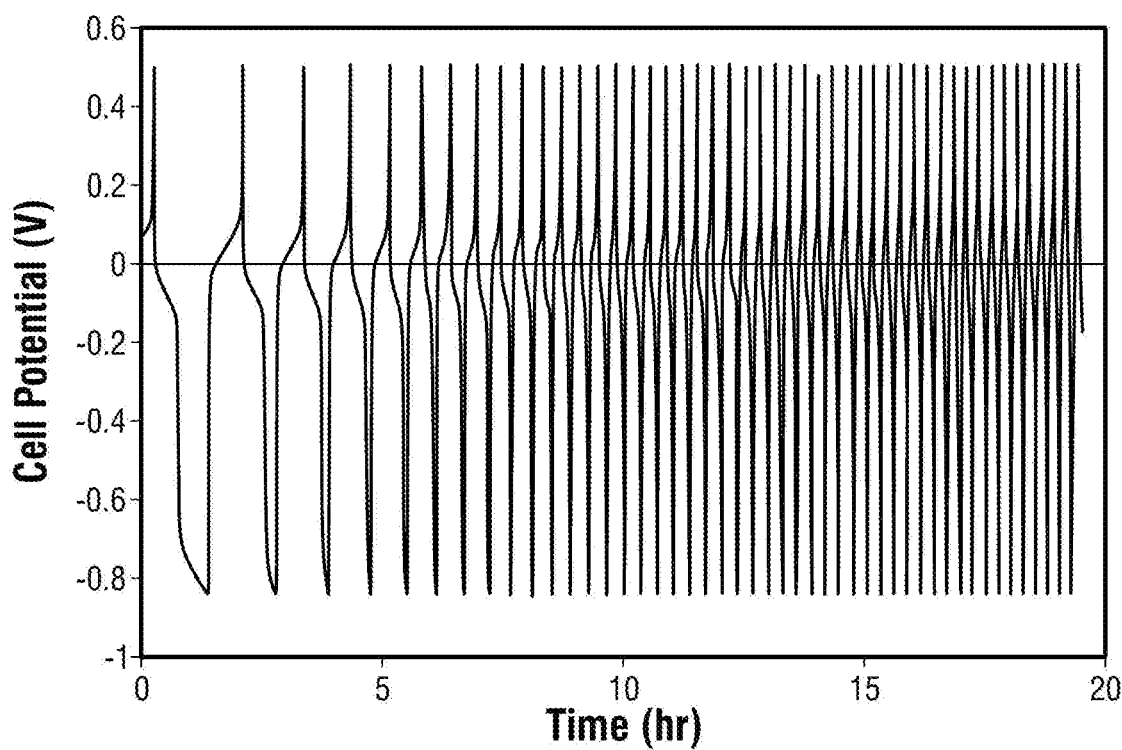
FIG. 7 shows the battery cycling behavior from a symmetric cell featuring 1.0 mAh of [BMIM]$_2$[FeCl$_4$]/[BMIM][FeCl$_4$] on either side of the cell, collected at a constant current of ±1 mA.
Figure 8:
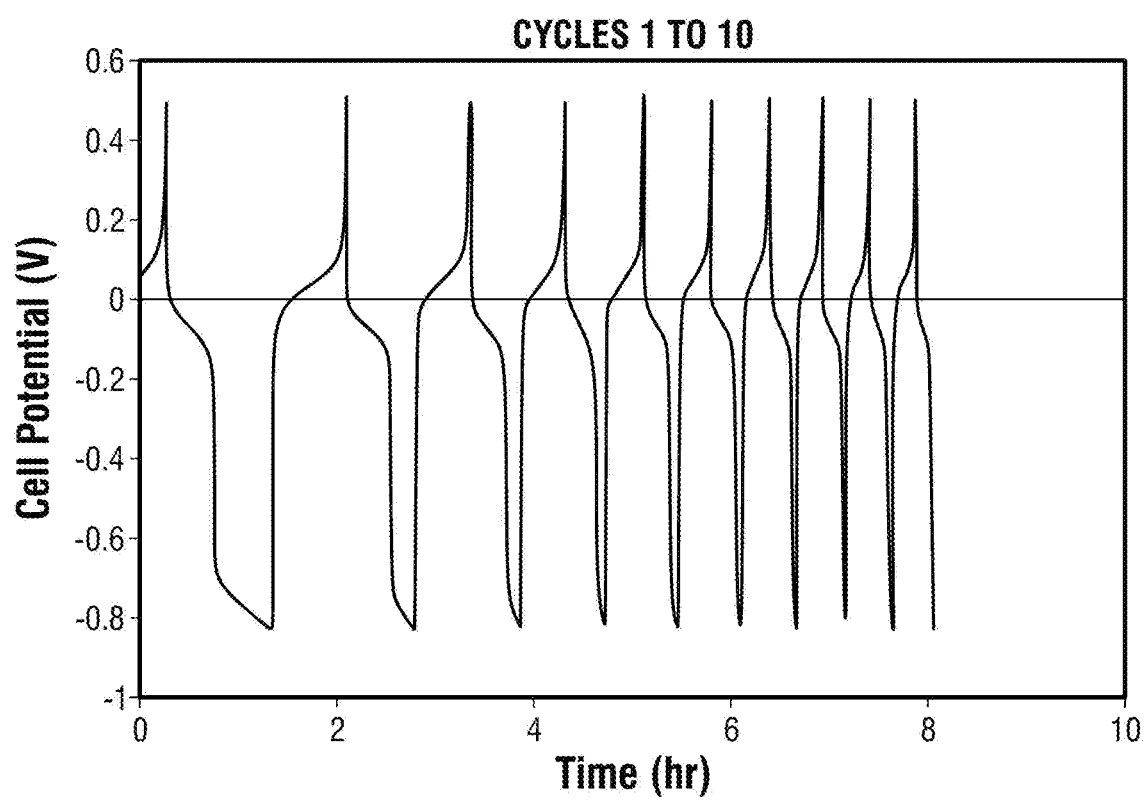
FIG. 8 shows the first ten cycles of FIG. 7.
Figure 9:
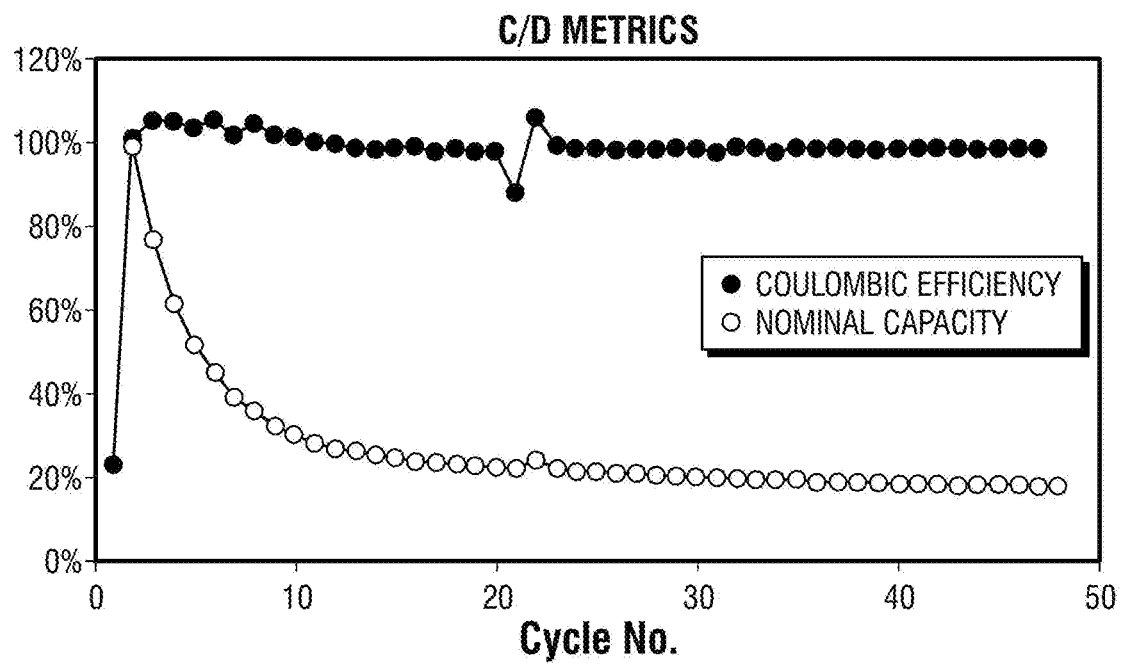
FIG. 9 indicates the relative capacity over time for the cycling experiment shown in FIG. 8, as well as the coulombic efficiency per cycle.

The material was further assessed in a symmetrical static charge/discharge set-up as a mimic of the electrochemical conversion cell in a redox flow battery. One half-cell was charged with $[BMIM]_2[Fe(II)Cl_4]$ and the second half-cell was charged with $[BMIM][Fe(III)Cl_4]$. The electrolyte was cycled for a total of 48 cycles in FIG. 7 with the first ten cycles shown in FIG. 9. The electrolyte demonstrates high coulombic efficiency; however, nominal capacity faded quickly as shown in FIG. 9.

Figure 10:
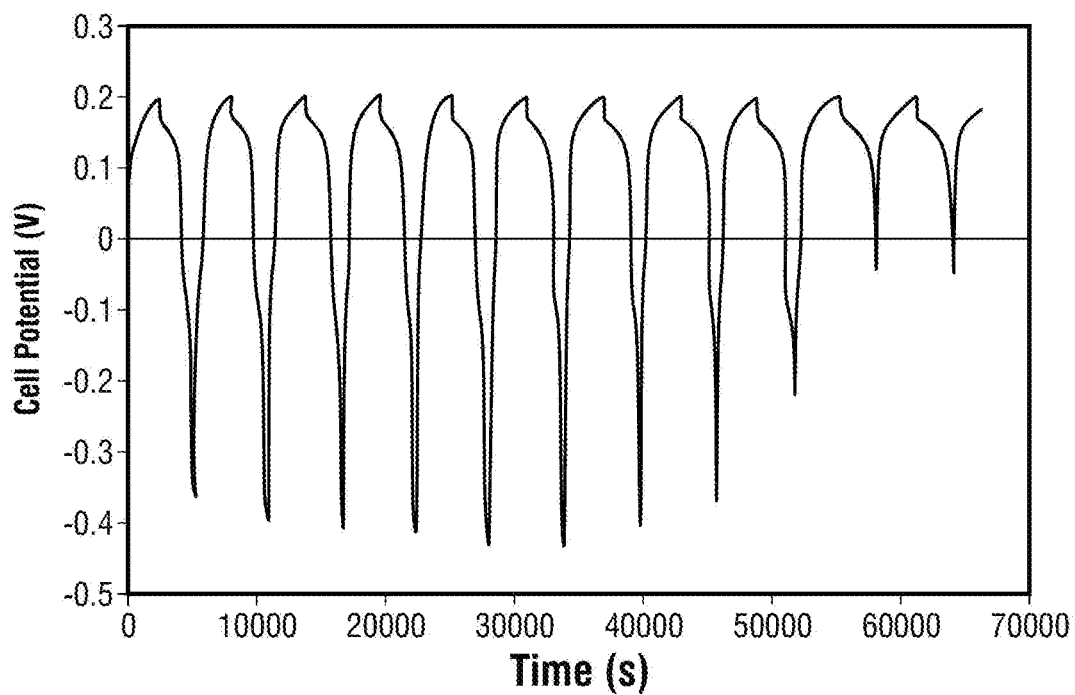
FIG. 10 shows the battery cycling behavior from an asymmetric cell featuring 1.0 mAh of [BMIM][FeCl$_4$]/ferrocene on either side of the cell.

A working full charge/discharge set-up has also been demonstrated using a $[BMIM][FeCl_4]$ half-cell with a ferrocene electrolyte used in the other half-cell. Several charge/discharge cycles are shown in FIG. 10 which shows the charge discharge assessment of the redox-active ionic liquid versus ferrocene in a static H-cell with a glass frit separator. Acetonitrile was utilized as the bulk solvent and 0.1 M 1-butyl-3-methylimidazolium hexafluorophosphate was used as the supporting electrolyte to minimize charge/discharge times and crossover. Charge/discharge rate was plus or minus 0.1 mA. Half Cell 1 is 1 mM $[BMIM][Fe(III)Cl_4]$ while Half Cell 2 is 1 mM ferrocene. While this system is unoptimized, it demonstrates a positive proof of concept for the use of $[BMIM][FeCl_4]$ in a redox flow battery application.

Focusing now on the advantages of the present invention, this has the advantage of low temperature operation relative to more conventional salt melts, and the advantage of relatively high energy density over more conventional anolyte or catholyte solutions containing solvent and supporting electrolytes. The present invention furthermore circumvents limitations in the voltage associated with the solvent's electrochemical window of stability. It should be noted that an additive, diluent or solvent may be added for various reasons to not use the electrolyte at full strength. The additive may alter the properties of the solvent.

Relative to liquid phase neutrally charged molecules, this invention does not require additional supporting electrolytes and does not solidify or form scale/precipitate upon changing oxidation states as is common when forming an ionic species from an uncharged liquid.

Relative to an all-vanadium redox flow battery, BIC has twice to three times the charge density or an improvement of 100-200%.

In an assessment of the performance of the $[BMIM]2[FeCl4]/[BMIM][FeCl4]$ materials in a battery relevant setting, gradual cross-over of the electroactive species and capacity fade are an inherent challenge and experiments were conducted that focused on eliminating secondary degradation mechanisms associated with choosing a chemistry to prepare a full electrochemical cell (specifically a cell and provide only information pertinent to the $[BMIM]2[FeCl4]/[BMIM][FeCl_4]$ redox chemistry. Cell charge capacity was seen to drop rapidly from 100% (normalized) in the first cycle to 30% by cycle 10 and then gradually fades to 20% by cycle 48. Several mechanisms may be responsible for the reduction in capacity such as cross-over of the electroactive materials through the glass frit, oxidation of Fe' species, and lower voltage cut-off being set at a potential capable of inducing over-discharge which most likely resulted in the formation of electrochemically irreversible species.

Figure 11:
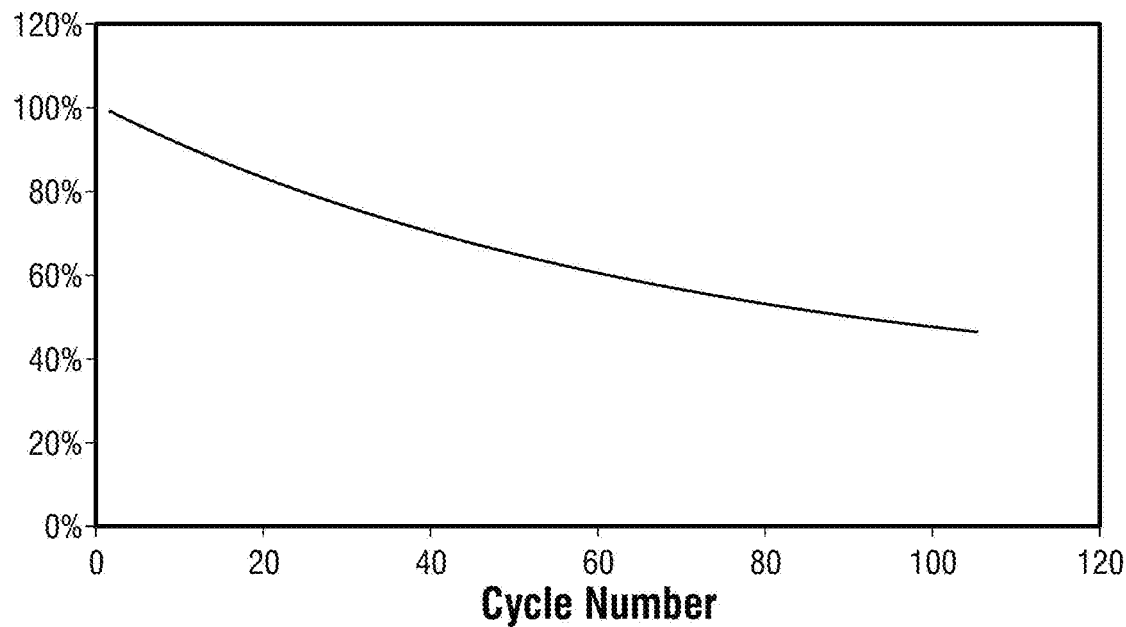
FIG. 11 indicates improved relative capacity over time for a symmetric cell comprised of [BMIM]$_2$[FeCl$_4$]/[BMIM][FeCl$_4$] where oxygen has been preferably excluded from the system.

Further experiments using nitrogen purging, a perfluorinated membrane rather than a glass frit where the membrane was presoaked with a 0.2 M [BMIM][PF6] solution in acetonitrile to facilitate cation exchange of the acidic sites and finally, the voltage cut-offs were adjusted to ±0.4 V to avoid over charging and discharging. The improved performance is shown in FIG. 11 showing 106 cycles.

Figure 12:
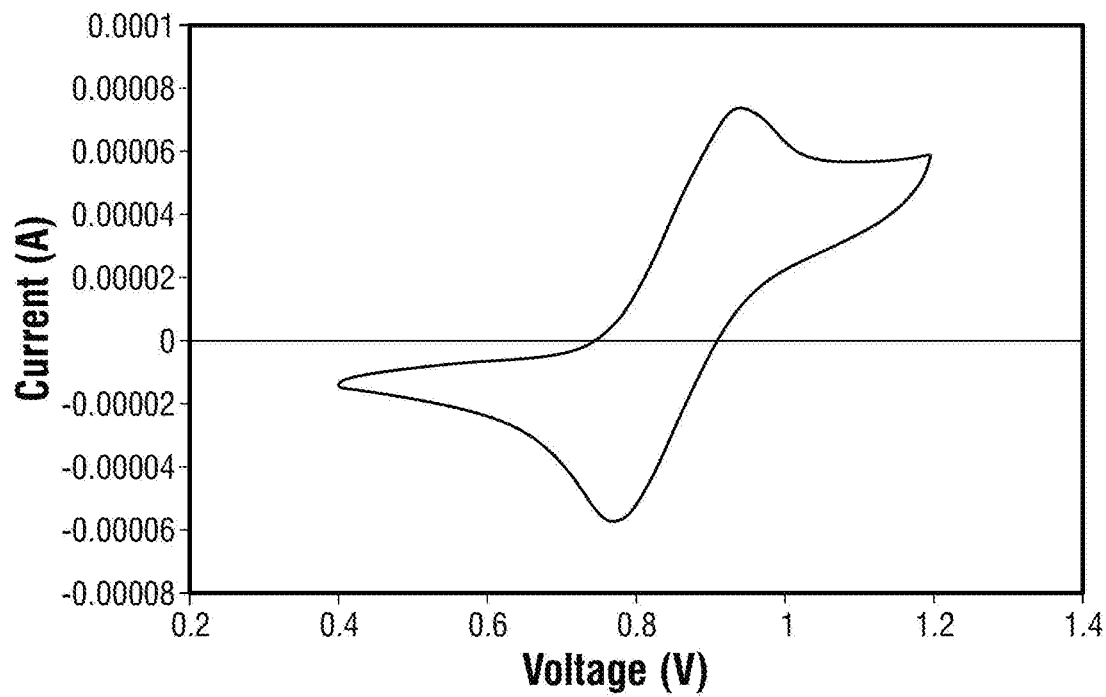
FIG. 12 shows a cyclic voltammogram of [BMIM]$_2$[MnCl$_4$] in propylene carbonate from 0.4 V to 1.2 V with [BMIM][PF$_6$] supporting electrolyte. The sweep was collected at a 100 mV/s scan rate.

In an effort to verify redox capability of other materials, it was found that ionic liquid 1-butyl-3-methylimidazolium tetrachloromanganate [BMIM]2[MnCl4] is redox active. So, rather than using iron as the transition metal, manganese is used in it place. Propylene carbonate is used as the supporting solvent and enabled a cyclic voltammogram shown in FIG. 12 to be measured.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A redox flow battery comprising:
   a catholyte;
   an anolyte;
   a catholyte storage tank for storing the catholyte;
   an anolyte storage tank for storing the anolyte;
   a power cell arranged for catholyte and anolyte to coexist and be physically separated while also in ion communication with one another;
   a catholyte pump to circulate the catholyte from the catholyte storage tank to the power cell and back to the catholyte storage tank; and
   an anolyte pump to circulate anolyte from the anolyte storage tank to the power cell and back to the anolyte storage tank;
   wherein one of the catholyte and anolyte comprises a metal-containing ionic liquid comprises 1-butyl-3-methylimidazolium tetrachloroferrate.

2. The redox flow battery according to claim 1 wherein the metal-containing ionic liquid comprises a transition metal ion.

3. The redox flow battery according to claim 2 wherein the transition metal is iron.

4. The redox flow battery according to claim 3 wherein the metal containing ionic liquid comprises iron tetrachloride as either a −1 or −2 charge polyatomic anion.

5. The redox flow battery according to claim 3 wherein the metal containing ionic liquid comprises 1-butyl-3-methyl-imidazolium cations.

6. The redox flow battery according to claim 2 wherein the metal containing ionic liquid comprises 1-butyl-3-methyl-imidazolium tetrachloroferrate.

7. The redox flow battery according to claim 2 wherein the transition metal is manganese.

8. The redox flow battery according to claim 7 wherein the metal containing ionic liquid comprises 1-butyl-3-methyl-imidazolium cations.

9. The redox flow battery according to claim 1 wherein the metal-containing ionic liquid is the anolyte.

10. The redox flow battery according to claim 1 wherein the metal-containing ionic liquid is the catholyte.

11. The redox flow battery according to claim 1 wherein the metal-containing ionic liquid has two or more oxidation states within the range of −3 to +1.4 volts compared to a standard hydrogen reference electrode where those accessible oxidation states being liquid phase within a temperature range of 30 to 110° F.

12. The redox flow battery according to claim 1 wherein the metal-containing ionic liquid has a charge density of at least about 50 Ah/L with ionic conductivity of at least about 100 µS/cm.

13. The redox flow battery according to claim 1 wherein the metal containing ionic liquid converts through the redox reactions at an effective heterogeneous rate constant on a graphitic electrode of no less than 0.05 cm/s while having an overall electrochemical stability window spanning at least 2 volts and a molecular weight less than of 1000 g/mol.

* * * * *